Dec. 16, 1930.  A. L. DUNCAN  1,785,007
FRUIT PITTING AND CORING MECHANISM
Filed May 14, 1927  6 Sheets-Sheet 3

Inventor
Arthur L. Duncan
By William A. Strauch
Attorney

Dec. 16, 1930.  A. L. DUNCAN  1,785,007
FRUIT PITTING AND CORING MECHANISM
Filed May 14, 1927  6 Sheets-Sheet 4

Patented Dec. 16, 1930

1,785,007

UNITED STATES PATENT OFFICE

ARTHUR L. DUNCAN, OF PIEDMONT, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

FRUIT PITTING AND CORING MECHANISM

Application filed May 14, 1927. Serial No. 191,334.

The present invention relates to improvements in fruit pitting and coring apparatus of the type disclosed in my copending application Serial No. 146,754, filed November 6, 1926. More particularly the invention relates to pittting and coring apparatus for the handling of single stone fruit, and especially adapted for pitting clingstone peaches.

As fully pointed out in the copending application above identified, of which this case is a continuation in part, and for reasons there given, a practical peach pitting machine must be inherently capable of adapting itself to pits of varying sizes located at differing positions in peaches of the same external dimensions, and in peaches of widely varying external sizes. The variations encountered in actual practice are fully pointed out in said copending application and need not be repeated here.

The primary object of this invention is to provide a pitting or coring machine that is even more adaptable to efficiently remove pits of widely varying sizes and locations in peaches of differing sizes than that disclosed in said copending application.

A further object of the invention is to provide an improved means to actuate the pitting knives and pitting jaws that tends to maintain said knives and jaws in operative position during the subsequent rotary movement of the knives.

A further object of the invention is to provide an improved means to cause actuation of a gauge that determines the position of the fruit at the end of the predetermined path provided to guide it to the machine.

A further object is to provide a readily accessible means to adjust the position of said gauge for various kinds of fruit.

A further object of the invention is to provide a novel means to automatically cut off the supply of air used to clear the machine of the fruit halves.

A still further object of the invention is to provide groove forming and guiding plates that provide substantially continuous out guide surfaces and that serve to house the fruit engaging jaws and pitting knives when said last named parts are in inoperative position.

A still further object of the invention is to provide a facile manner of adjusting the width of the path, provided between the recess forming blades for the pit of the fruit.

Still further objects will appear as the description proceeds with reference to the accompanying drawings.

Further objects of the invention are such as may be attained by a utilization of the various combinations, subcombinations and principles hereinafter set forth and as defined by the terms of the appended claims.

Figure 1:
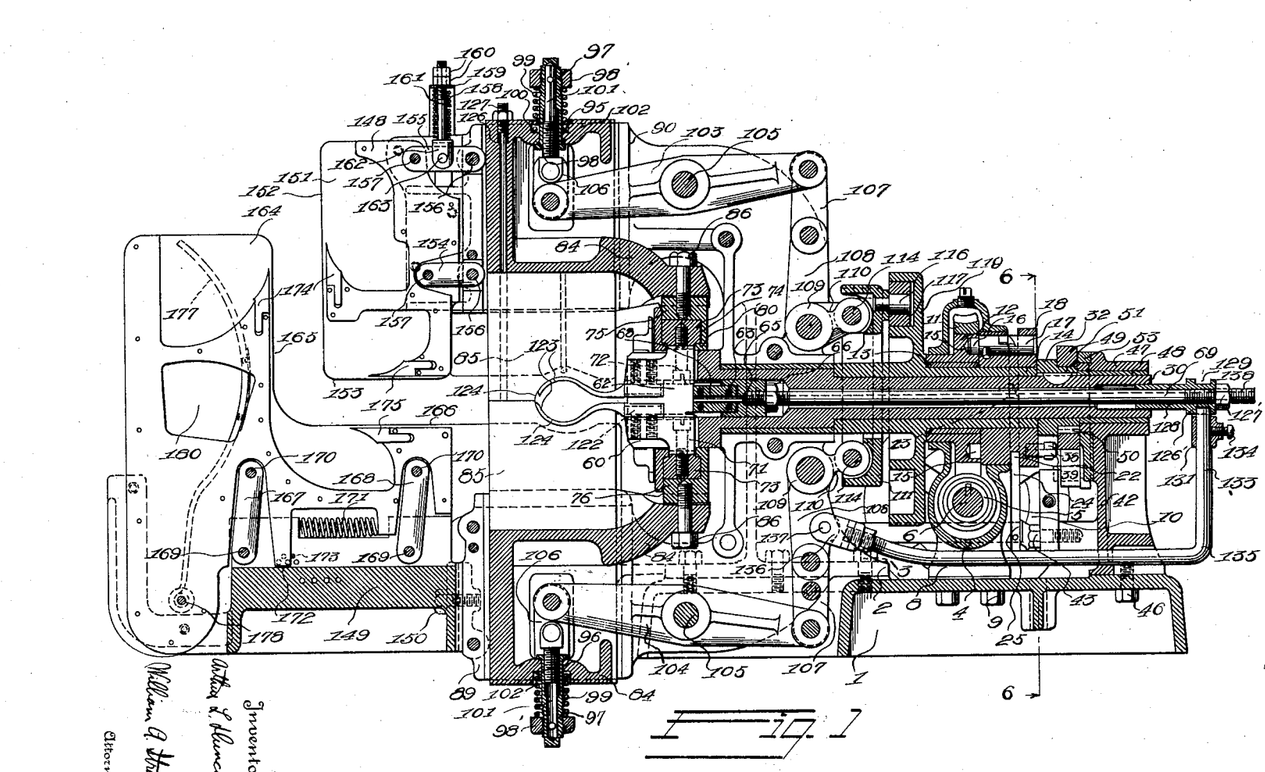
Figure 1 is a sectional elevation showing a preferred embodiment of my invention.
Figure 2:
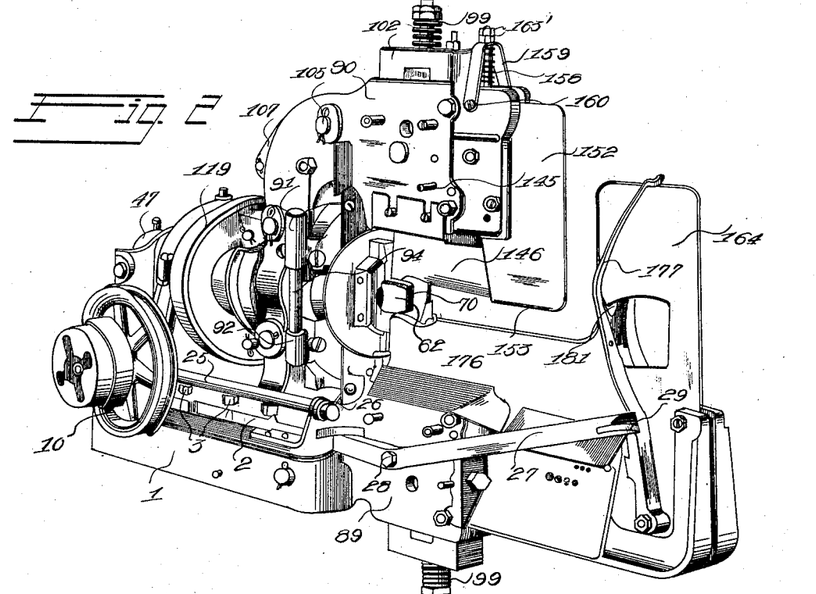
Figure 2 is a perspective view of the form of invention shown in Figure 1 as viewed from the front of the machine.
Figure 3:
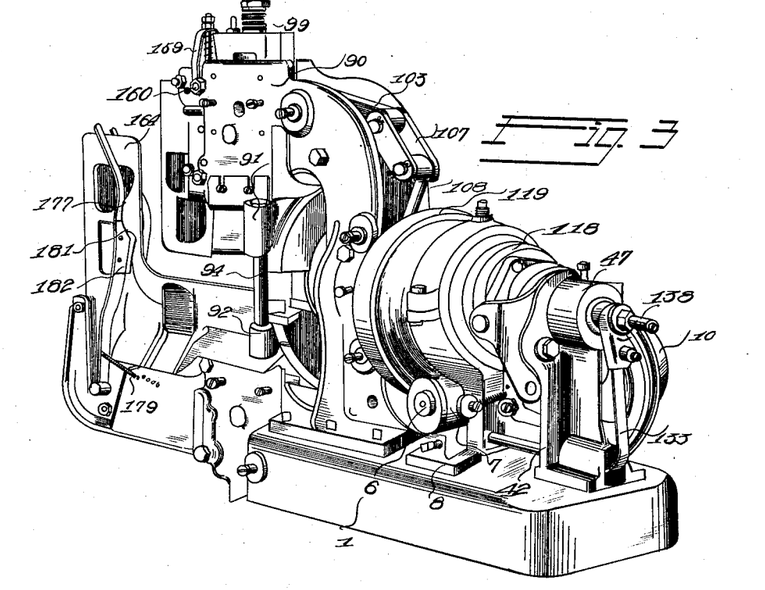
Figure 3 is a perspective view of the machine, looking at the rear end thereof.

Referring to Figures 1 and 2 the numeral 1 indicates a base casting to which the bearing bracket 2 is secured by means of cap screws 3. Secured to base casting is a casing section 4 (Figure 1) in which worm 5 is disposed. Worm 5 is rigidly secured to and driven by a drive shaft 6 which is supported in bearing 7 (Figures 2 and 3) of the supporting bracket 8 secured to the base 1 by cap screws 9. Power is transmitted to the drive shaft 6 from a suitably driven pulley 10 through a friction clutch coupling said pulley and shaft together as more fully described in my copending application Serial No. 146,754 filed November 6, 1926.

Figure 4:
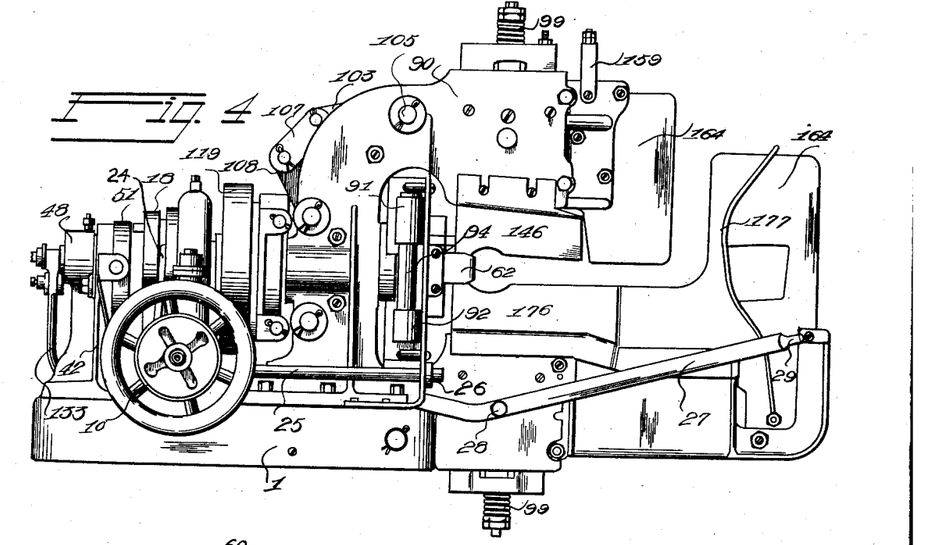
Figure 4 is a side elevation of the machine.
Figure 5:
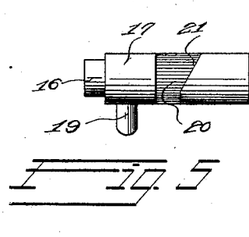
Figure 5 is a detail view of the clutch pin.

Meshing with and driven by the worm 5 is an assembly consisting of a worm ring gear 11 secured to a hardened sleeve 12 provided with a bushing 13. Said assembly is journaled for rotation on the sleeve 14 constituting a part of the main cam of the machine to be later described. Around the face of sleeve 12 a series of spaced clutch holes 15 are formed. Projection or pin 16 of a sliding clutch member 17 is adapted to fit into holes 15. Clutch member 17 (see Figure 5) is mounted in a suitable bore formed in clutch disk 18 which in turn is keyed to and drives the sleeve 14. Arranged in a suitable recess in disk 18 and between projection 19 on member 17 and the end of said recess is a coil spring urging member 17 toward sleeve 12. Member 17 has a notch or groove 20 provided with an inclined cam wall 21. With the end 16 of clutch pin nested in one of the holes 15, a driving connection is established between the gear 11 and the clutch disk 18. Side wall 21 of groove 20 is positioned in a clutch pawl groove 22 formed in the periphery of the clutch disk 18. Normally resting in the groove 22 is a beveled cam end 23 (Figures 1 and 4) of the clutch pawl 24. Clutch pawl 24 is secured to a shaft 25 journaled in brackets 26 supported on base 1. (See Figure 4). Shaft 25 is provided with an arm linked to the lever 27 pivoted at 28 to the frame of the machine. Lever 27 is provided with actuating hand plate 29 positioned to be conveniently engaged by the hand of an operator immediately after a fruit is in position to be cored as will more fully hereinafter appear. A suitable spring may be connected between the clutch pawl 24 and the base casting 1 to hold the beveled end 23 of the pawl 24 normally in position in the groove 22 of the clutch disk 18.

Figure 6:
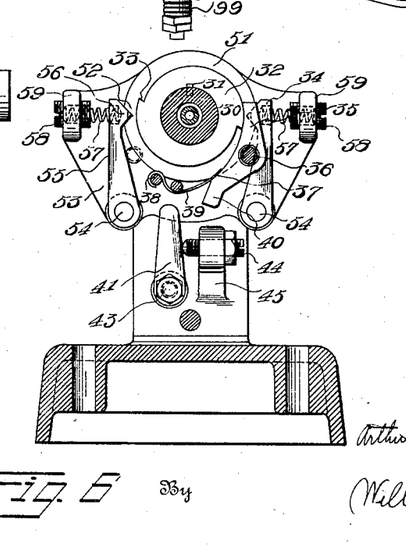
Figure 6 is a sectional view taken along line 6—6 of Figure 1 showing the driving ratchet.

Sleeve 14 is journaled for rotation on hollow main shaft 30. Mounted on main shaft 30 and secured thereto by key 31 (Figure 6) is a ratchet disk 32 provided with the diametrically opposite ratchet teeth 33. Ratchet teeth 33 are adapted to be engaged by the end 34 of a pawl 35 which is pivotally supported on pin 36. Spring 37 coiled about pins 38 and 39 engages pawl 35 to force it about its pivot so that the end 34 thereof is held against the periphery of ratchet 32. Pins 36, 38 and 39 are rigidly secured to clutch disk 18 (see Figure 1). Pawl 35 is provided with an extension 40 which is adapted to engage the upper end of throwout latch 41 (Figure 6). Latch 41 is secured on an extension of rear bearing bracket 42 by means of securing stud 43. An adjusting stop screw 44 threaded in an extension 45 of the bearing bracket 42 is provided for latch 41. By adjusting stop screw 44 and thus shifting latch 41 the point in the cycle of operations at which the extension 40 of pawl 35 will engage the end of the latch 41 may be varied.

Bearing bracket 42 is secured to base casting 1 by means of the cap screws 46, and formed at the upper part of the bracket is a journal 47 provided with a bushing 48 in which the main shaft 30 is journaled for rotation. Keyed on a reduced cylindrical extension 49 of disk 32 by means of key 50 (Figure 1) is registering disk 51 provided with diametrically opposite stop notches 52. Secured to and pivotally supported from member 53 attached to bracket 42 by means of the pivot pins 54 are registering latches 55 which are provided with registering extensions 56 adapted to fit into the registering notches 52 and thereby locate shaft 30 in normal position. Helical springs 57 are interposed between adjustable abutments 58, threaded in brackets 59 secured to member 53, force the extensions 56 toward the notches on the periphery of the registering disk 51.

Figures 7, 8:
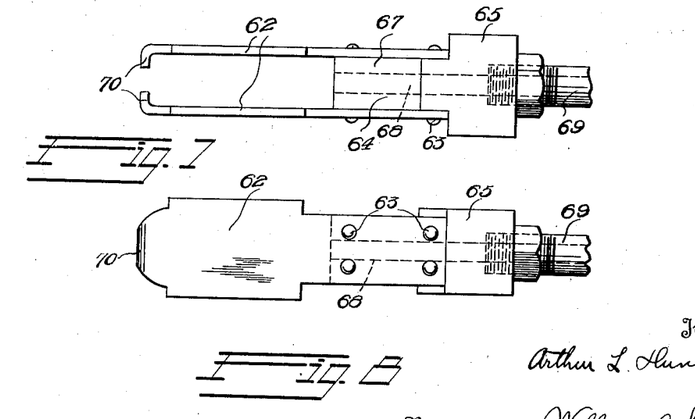
Figures 7 and 8 are detailed plan and side views showing the gauge plates.
Figure 9:
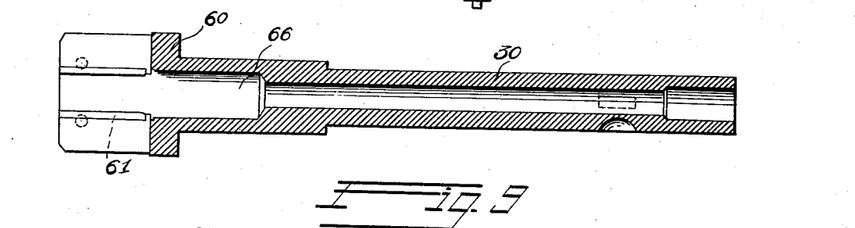
Figures 9 and 10 show the main shaft in section and side elevation.
Figure 10:
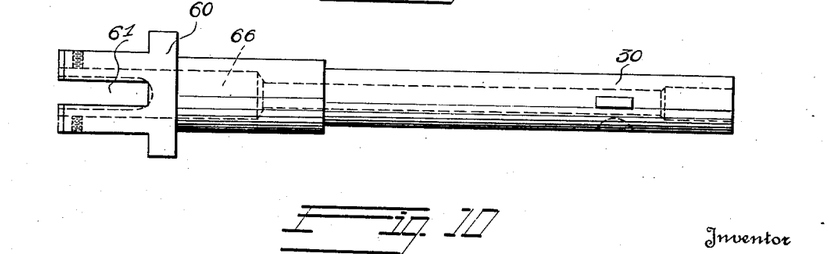

Main shaft 30 has formed integrally with the inner end thereof a head 60 slotted or bifurcated to form a central guide slot 61 (Figures 1, 9 and 10) against the sides of which a pair of slidable gauge plates 62 are guided. (Figures 1, 7 and 8). Gauge plates 62 are secured by suitable means 63 to a member 64 having a cylindrical body 65 that is slidably mounted in an enlarged bore 66 of hollow main shaft 30. Said body 65 has a forward projection 67 to which the gauge plates 62 are secured. Member 64 is bored axially as shown at 68 for a purpose presently to be described and is provided with a tubular operating rod 69, the bore of which registers with the bore 68 of the member 64. As clearly shown in Figures 2 and 7, the gauge plates 62 are provided with inwardly turned ends 70 to provide abutments of substantial width for the fruit.

Figure 11:
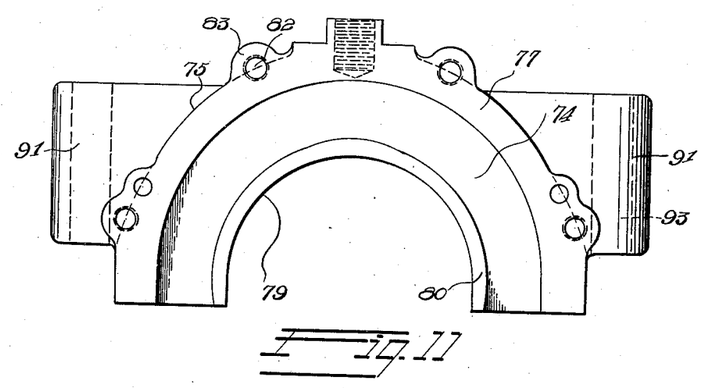
Figure 11 is a side elevation of the main portion of the upper knife guiding cam.
Figure 12:
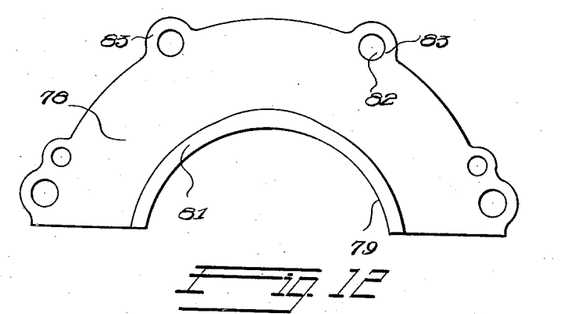
Figure 12 is a side elevation of the other portion of the same cam.

Slidably supported in the bifurcation 61 of head 60 of shaft 30 and guided for reciprocation between the gauge plates 62 are knife holders 71. Secured to the knife holders 71 by cap screws 72 are the cam guide blocks 73 (Figure 1). Guide blocks 73 are mounted in cam grooves 74 of the sectional cam guides 75 and 76. Cam guides 75 and 76 are substantial duplicates, the one being the reverse of the other so that together they form an endless cam guide groove 74 through which the blocks 73 move and thus determine the path of bodily movement of the knife holders 71. One of the cam guides, the upper one, is shown in detail in Figures 11 and 12. It comprises two members, a body member 77 and cover member 78, the former being shown in Figure 11 and the latter in Figure 12. The members 77 and 78 are provided with semi-circular recesses 79 in which the head 60 rotates. The lower cam guide 76 contains a matching recess, as will be readily understood (see Figure 1). Member 77 is provided with one-half of cam guide groove 74, which as shown in Figures 11 and 12 is not circular, but is made slightly elliptical so that the knife holders will follow an elliptical path for a purpose hereinafter described. An inwardly projecting shoulder 80 on member 77 and a similar shoulder 81 on cover member 78 provide a cam groove that embraces the cam block 73 on all sides and firmly supports the knife blocks 71 from movement in any direction but that permitted by the cam groove 74. Members 77 and 78 are secured together as shown in Figure 11 by suitable fasteners that traverse openings 82 formed in lugs 83 in said members.

Figure 13:
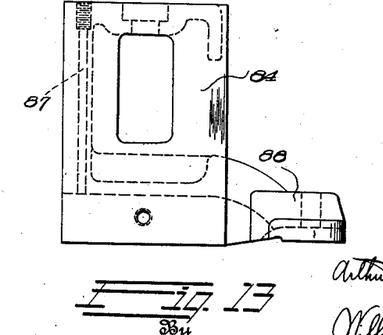
Figure 13 is a side elevation of one of the jaw holders and slides.

In operation, rotation of the head 60 drives the knife holders 71 and rotates the guide blocks 73 through the cam grooves 74. Cam grooves 74 may be made of any suitable shape, but are preferably of the shape above described so that the blocks 73 will follow a path conforming generally to the curvature of the pit to be removed. In varieties of fruit having pits substantially circular in transverse section, a cam with a circular groove 74 may be utilized, while with fruit having flattened sides, groove 74 may be shaped to cause blocks 73 to follow a path of varying radius to cut an oval or elliptical shaped core from the fruit to be cored. Cam members 75 and 76 are secured to jaw holders 84 which are recessed to receive jaws 85. Jaw holders 84 (Figure 1) are secured to cam members 75 and 76 by means of suitable cap screws 86. Jaws 85 are of a suitable width to enter an annular grove or channel formed in the fruit to be pitted. One, the upper, jaw holder 84 is shown in detail in Figure 13. It is, preferably, a hollow casting having a body portion 87 and an extension 88 for attachment to the cam guide 75 as above stated. The outer surfaces of the jaw holders 84 and 85 are finished and are arranged to slide in castings 89 and 90 secured to the base 1 of the machine.

Formed on opposite sides of the cam members 75 and 76 are bosses 91 and 92 in which bores 93 are formed. Bores 93 on the upper member 73 slidably fit on the vertical guide rods 94 (Figures 2, 3 and 4) which are rigidly secured to and mounted in bores 93 on the lower member 76. Rods 94 maintain members 75 and 76 in alignment.

The jaw holders 84 are bored vertically as shown at 95 and 96 (Figure 1) to slidably receive sleeves 97 each of which is provided with a shoulder 98 arranged to serve as a stop to limit the movement of the sleeve in one direction. Each sleeve 97 is threaded externally to receive a nut 98'. A coil spring 99 surrounds each sleeve and abuts against nut 98' and a shoulder formed by recessing the body 87 of holders 84 as shown at 100 (Figure 1). It will be apparent that the tension of coil springs 99 may be adjusted by manipulation of nuts 98'.

Each sleeve is bored axially as shown at 101 and tapped to receive the threaded shank of a member 102. The holders 84 are caused to reciprocate toward and from each other by levers 103 and 104 pivoted to frame castings 89 and 90 at 105 between their ends and linked by means of links 106 to members 102 at one end of each of said levers 103 and 104. The other ends of each of said levers are connected by means of links 107, to the long arms 108 of a pair of bell crank levers 109. The short arms 110 of said bell crank levers are connected together by a link 111 shown in detail in Figure 14. This link is a box like structure open at its center as shown at 112 so that the main shaft 30 and the cam shaft presently to be described may freely pass therethrough. Link 111 is provided with two pairs of spaced ears 113 between which arms 110 of bell crank levers 109 are pivoted by means of pins 114. Link 111 is bored as shown at 115 to receive the securing end of a stud 116 on which is mounted a cam roller 117 (see Figure 1).

Figures 14, 15, 16, 17, 18, 19:
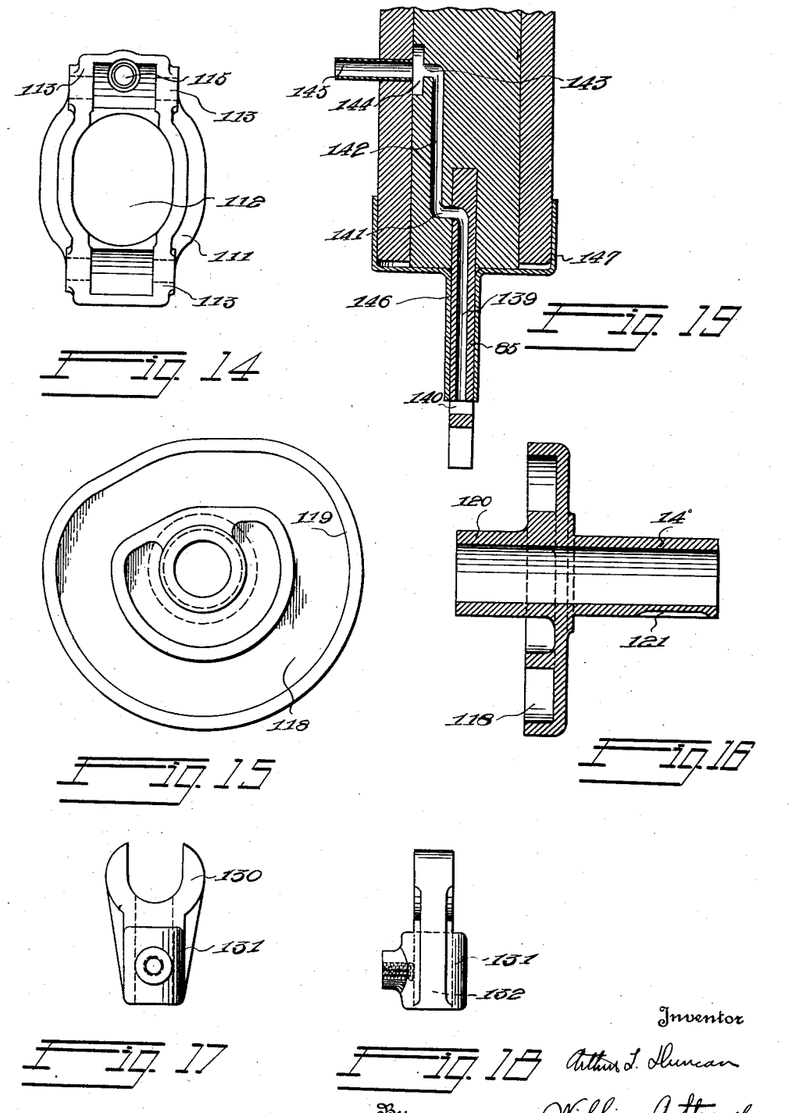
Figure 14 is a detail view of the toggle connecting link.
Figures 15 and 16 are end and sectional views respectively of the main cam and the sleeve carried thereby.
Figures 17 and 18 are side elevations of the bracket used to connect the gauge rod to its operating mechanism.
Figure 19 is a detail sectional view through the upper jaw and its guide casting showing the general arrangement of the air ducts.

Cam roller 117 rides in a cam groove 118 in main cam 119 shown in detail in Figures 15 and 16. Cam 119 has tubular or sleeve like extensions 120 and 14, before referred to, and said cam and extensions are sleeved on main shaft 30 as shown in Figure 1. Sleeve 14 is provided with a keyway 121 to receive the key by which the main cam is caused to move with the clutch disk 18 before referred to.

Formed in the knife holders 71 are suitable rectangular recesses adapted to receive the rectangular shanks 122 of the curved pitting knives 123. Knives 123 are narrow, being preferably one-quarter inch or less in width to fit into a channel or recess formed in a fruit to be pitted, and are provided with outwardly beveled cutting edges. Knives 123 are preferably made of yieldable spring steel and are so positioned that they normally nest within curved recesses 124 formed in jaws 85. It will be noted that knife holders 71 and knives 123 are movable with the jaws 85. To limit the inward motion of the jaws and knives to accommodate different sizes of fruit pits or cores, a bore 126 is formed in the upper one of the jaws 85 and holder 84 and at the top of this bore is a threaded section in which long adjustable stop screw 127 is threaded.

Operating rod 69 for gauge plates 62 passes axially through the hollow main shaft 30 and is provided with an internally threaded guiding sleeve 126' adjustably threaded thereon and locked in position by a lock nut 127'. By this means the position of the gauge plates 62 when in operative position may be readily adjusted in accordance with the size of fruit operated upon. Sleeve 126' has a guiding extension 128 slidably mounted in an enlarged bore in main shaft 30 as clearly shown in Figure 1, and is provided with a groove 129 to receive the fork 130 of an operating member 131 provided with a bore 132 (see Figures 17 and 18) that receives the end of an operating rod 133. A set screw 134 holds the parts in assembled relation. Rod 133 is bent at an angle as shown at 135 and provideed with a bifurcated bracket 136 that is secured to the long arm 108 of lower bell crank lever 109 (see Figure 1) between the ends thereof, by means of a pin 137.

Means are provided for clearing the machine of the fruit halves and the core after the central core has been severed from the pulp, and to remove particles of pulp which tend to adhere to the mechanism. The rod 69 is made in the form of a tube that registers with a bore 68 of member 64 as before pointed out. The inner end of the bore 68 is disposed immediately back of the knife holders so that a compressed air blast or other fluid from the pipe will force the core from between the knives 123 and will clear the machine of adhering pulp as will more fully hereinafter appear. For this purpose a source of air pressure may be connected to the end 138 of rod 69 by any suitable connection.

In order to insure the removal of the pulp halves from between the jaws 85 after the removal of the core, an air blast is directed laterally from the jaw sides. To accomplish this result an air conduit 139 having lateral passages 140 is provided in jaw 85 (Figure 19). Passage 139 communicates with a passage 141 in slide 84 that in turn communicates with a vertical passage 142 leading to a passage 143 that has a wide mouth 144 in the side of the slide 84. A conduit 145 in casing 90 is secured in position so that its inner end registers with mouth 144 when the jaw 85 is in operative position. Conduit 145 may be connected to any suitable source of light air pressure. It will be observed that movement of the slide 84 to retract the jaws shuts off the flow of air to conduit 144, the slide acting like a slide valve to close the mouth of conduit 145. Suitable face plates 146 and 147 are secured on opposite sides of casing 90 and project inwardly into engagement with jaw 85. It will be understood that the jaw 85 moves inwardly between these plates when it is retracted and said plates likewise serve to shut off the flow of air through conduits 140. The mouth 144 of conduit 143 is made wide so that air will flow to the jaws in all positions of the stop screw 127 before referred to. The lower jaw may be provided with a similar arrangement to remove the pulp halves from the machine by an air blast, if desired.

The fruit to be cored is guided into position between the jaws and pitting knives by means that form a circumferential recess in the peach in the plane of the suture of the pit. This means comprises an upper bracket 148 supported from casting 90 and a lower bracket 149 secured to base casting 11 by cap screws 150. For pitting high grade fruit upper feed blade structure is preferably composed of two blades 151 separated slightly from each other but secured together to move as a unit. Blades 151 are provided with cutting edges 152 and 153 preferably at right angles to each other, the edges of which are inclined outwardly away from the space between the blades causing the pulp of the fruit to be slightly wedged apart as the circumferential groove is formed. Blades 151 are mounted to swing vertically on parallel links 154 and 155 pivoted to the bracket 148 by means of pins 156 and to blades 151 by means of pins 157. A spring 158 is disposed in a swinging yoke 159 pivoted to bracket 148 by means of pins 160. Spring 158 is arranged on a member 161 that has a bifurcated head 162 pivotally secured to link 155 by pin 163, and said spring is arranged between said head and the top of yoke 159. Member 161 is threaded at the end opposite head 162 and passes loosely through the top of yoke 159. Nuts 163' serve to provide an adjustable abutment, whereby the limit position of the links 154 and 155 and the blades 151 may be readily adjusted for various size pits, if desired.

The lower blade structure is likewise preferably composed of two spaced blades 164 secured together to move as a unit for pitting high grade fruit and it too has outwardly beveled cutting edges 165 and 166 parallel to the cutting edges of the upper structure blade. Blades 164 swing on a horizontal line on parallel links 167 and 168 pivoted at their lower ends to the bracket 149 by means of pins 169 and at their upper ends to the blades 164 by means of pins 170. A coil spring 171 interposed between suitable projections of bracket 149 and blades 164, yieldingly maintains the lower blade structure in position. In case it is desired to eliminate the yielding action of the blades, suitable holes 172 may be formed in the supporting brackets and blades through which securing pins 173 may be passed to hold the blades rigidly in the desired relation and a relative adjustment of the blades in fixed positions to vary the size of the pit passageway is permitted.

Gauges 174 and 175 are arranged between the sets of blades 151 and 164 to transversely cut and remove the narrow strip of the peach that enters between the blades of each set. Suitable openings may be provided in the blades of each set adjacent the gauges to permit the discharge of the portions of the annular strip removed during the feeding operation. Preferably the openings are cut in one blade only so as not to provide a ledge upon which the strips can collect. When handling lower grades of fruit the blades may be made solid and the groove in the pulp formed solely by a wedging action in obvious manner without removing a slice. As clearly shown in Figures 2 and 4 the lower blades 164 are continued toward the pitting head as shown in 176 to a point adjacent the pitting head. Lower jaw 85 retreats between said blades. It will be observed that this arrangement provides a smooth guiding surface for the fruit so that it may be readily guided into position between the jaws. It will also be observed from the same figures that face plates 146 and 147 are in substantial alignment with upper blades 151 for the same purpose. Substantially discontinuous guiding surfaces are thus provided cooperating with the groove forming knives or blades 151 and 164 to guide the fruit to the coring station.

A tip remover is provided adjacent the path of the peach between blades 151 and 164 which includes a frame 177 pivoted to a projection of frame 149 by means of pin 178. A spring 179 between frame 177 urges the frame forwardly against the end wall of an opening 180 in which frame 177 rides. The upper end of frame 179 is curved rearwardly and is provided with a deep V-shaped cut 181 from its upper edge. A tip removing blade 182 is secured to frame 177 in position to cut off the tip of each peach, the curved upper end of the frame and the V-shaped cut therein serving to bring the blade 182 into effective operation on peaches of widely varying sizes, the range of movement of the frame in opening 180 being sufficient for this purpose.

Operation

In operation on peaches, the pitting knives 123 and jaws 85 are normally open. Gauges 62 are in forward position. A peach to be pitted is inserted in the channel between the blades 151 and 164 with the tip toward the operator as shown in Figure 1, and with the plane of the suture of the pit of the peach indicated by a crease on the outside of the fruit, substantially in the vertical central plane of the blades. The operator then forces the peach downwardly between the blades removing the tip and cutting vertical kerfs in the ends of the peach in the plane of the suture of the pit. If the pit is larger than the space between the blades 151 and 164, blade 164 yields swinging in a horizontal plane on links 167 and 168 against the action of spring 171.

The operator moves the peach to the end of the vertical branch of the path between blades 151 and 164, and then moves it bodily in a horizontal direction between the blades until the stem end of the pit engages the ends of gauge plates 62. At this point in the operation, a circumferential channel, recess, or groove has been formed around the peach in the plane of the suture of the pit and the pulp halves are slightly wedged apart and the peach is in position for the cutting out of the pit with the suture of the pit between knives 125 and the inner edges of jaws 85 in the channel in the fruit pulp. The hand plate 29 of clutch control lever 27 is in position to be engaged conveniently by the hand of the operator after he or she completes the movement of the peach in the horizonal direction. As the movement of the peach is completed plate 29 is depressed rocking lever 27 and shaft 25. This movement of shaft 25 rocks the upper end of pawl 24 outward freeing pin 17 for movement under the influence of its spring and causing projection 16 to enter a hole 15 causing rotation of sleeve 14. The end 34 of pawl 35 is normally not in engagement with one of the teeth 33 on ratchet 32 keyed to the main shaft 30, but is between the teeth. Accordingly, the main shaft 30 does not turn immediately, but the sleeve 14 rotates through part of a revolution before the main shaft is brought into operation and rotates cam 119 shifting connecting link 111 outward and the bell crank levers 109 and the parts connected thereto to the position of parts shown in Figure 1. As the toggles formed by long arms 108 of the bell cranks and links 107 straighten, holders 82 are brought together and due to the action of springs 99 yieldingly closes jaws 85 and knives 125 firmly about the suture of the pit. Movement of jaws 85 and knives 123 inwardly through rod 133 connected to long arm of the lower bell crank lever causes withdrawal of the gauges 62 so that when the pitting knives are rotated, the ends of the gauges will not mutilate the edges of the fruit halves. In this way the jaws and knives automatically adjust themselves to accommodate varying diameters of pits and at the same time center the fruit pit within the compass of the knives 125. When the jaws are closed they firmly press the knives about the suture of the pit preventing distortion of the knives due to their flexibility, and they also serve to support the flesh of the peach immediately adjacent the line of the cut, so that clean cut edges are produced.

After the completion of the above operations, pawl end 34 carried on sleeve 14 engages one of the teeth on ratchet 32 resulting in the rotation of the main shaft 30 and pitting knife holders 72 with knives 123 through half a revolution. Guides 73 moving in cam grooves 74 (Figure 11) determine the shape of a central core including the whole pit that is cut from the fruit just before a half revolution of shaft 30 is completed, and without knives 123 crossing the plane of the suture of the pit starting the cutting operation. Cam grooves 74 are preferably shaped to force the knives 123 to follow a path that corresponds approximately to the shape of the pit sides to eliminate the waste of desirable pulp portions that occurs when the knives follow a true circular path in pitting fruit with pits non-circular in transverse section. After the completion of a half-revolution of shaft 30, lug 40 of pawl 35 engages the end of throwout latch 41 and end 34 of pawl 35, thus serving to disconnect shaft 30 from rotating sleeve 14. At the same time registering latch projection 55 engages a notch 52 on registering disk 51 of shaft 30, serving to hold shaft 30 in position for the next operation. Compressed air from openings 140 of upper jaw 85 blows the pulp halves outward, and continued rotation of sleeve 14 actuates cam 111 to break the toggle consisting of arms 107 and 108 to thus separate holders 75, together with jaws 85 and knives 125. As the parts separate, fluid or air under pressure from central pipe 138 blows the core from between the knives and clears the knives and jaws of adhering juices and pulp, keeping the machine clean and in sanitary condition. It will also be noted that as the jaws are retracted the movement of the slides 84 that carries them throws the air port 144 in the slide out of registry with port 145 (Figure 17) thus shutting off the flow of air. At the same time outlet ports 140 retreat between plates 146 and 147 providing a further cut off for the air flow.

In case the pitting knives 123 encounter an obstacle such as an unusually large pit, the friction clutch 14 will slip permitting the knives to stop and avoiding knife breakages. In such a case the machine is cleared of the abnormal peach if necessary. After the machine is cleared, the friction clutch will again drive the shaft 6 and the mechanism until the revolution of clutch disk 18 is completed when wall 21 of pin 17 will engage the cam end 23 of pawl 24 positioned in groove 22 by the action of a suitable spring. This will shift pin 17 to the left in Figure 1 disengaging projection 16 from the hole 15 and the parts will come to rest with knives 123 nested in recesses 124 of jaws 85 and the parts open to receive the next fruit to be cored. In this way it will be seen that each time hand plate 29 is actuated a complete cycle of operation occurs and at the end of each cycle the parts come to rest.

While the invention has been above described in great detail, it should be understood that it is not restricted, to such details which may be varied widely without departing from the spirit of the invention, and that the scope thereof is to be determined from the terms of the following claims.

Having described preferred embodiments only of the invention, what is desired to be secured by Letters Patent, and claimed as new is:

1. A fruit coring machine comprising means to form a recess in the flesh of the fruit and to guide the fruit in a substantially predetermined path toward a coring station, a gauge to position the fruit at said coring station, rotatable coring means, mechanism operating in timed relation to withdraw said gauge and to then position and rotate said coring means to remove the core, said mechanism including elements to vary the operative position of said gauge.

2. A fruit coring machine comprising rotatably mounted coring means, movable means to hold the fruit in position during the coring thereof, a movable gauge to predetermine the position of the fruit, and mechanism operating in timed relation to successively withdraw said gauge, move said holding and coring means into position, and to then rotate said coring means, said mechanism including elements to adjust the operative position of said movable gauge.

3. A fruit coring machine including a frame, slides mounted in said frame, fruit holding means carried by said slides, a rotatable coring head, a coring knife carrier slidably mounted in said head, and guides carried by said slides and connected to said carriers to predetermine the path of movement of said carriers, knives secured to said carriers, and mechanism to reciprocate said slides and to rotate said head in timed relation and in succession.

4. A fruit pitting machine including oppositely moving means to hold the fruit during the pitting operation, elements to predetermine the path of movement of the pitting elements attached to said means, and mechanism to move said means and elements into position and to hold it in position during the operation of the pitting elements comprising toggle links that are arranged so as to be substantially in alignment when said means are in operative position.

5. A fruit pitting machine comprising oppositely slidable means to hold the fruit during the pitting operation, elements to predetermine the path of movement of the pitting elements attached to said means, a rotatable pitting head, knife carriers slidable in said head and including elements to connect them with said oppositely slidable means, mechanism to operate said last named means and said head in timed relation, including pairs of toggle links and a unitary element to simultaneously cause each pair of links to extend substantially in a straight line when said oppositely slidable means are in operative position.

6. A peach pitting machine including oppositely movable fruit holding jaws arranged to move into position to hold the peach during the pitting operation, and means including toggle links to simultaneously move said jaws to operative position with the toggle links substantially aligned whereby said links will maintain said jaws in operative position until the links are caused to be moved out of alignment.

7. A peach pitting machine including a frame, oppositely movable slides mounted in said frame, jaws carried by said slides, levers pivoted to said frame between their ends and connected to said slides at one end, a pair of bell crank levers pivoted on the frame, one arm of each of said levers being connected to the other end of each of said first named levers, means coupling the other arms of said bell crank levers together for simultaneous movement and mechanism to operate said last named means.

8. A peach pitting machine comprising a pair of jaws arranged to hold the peach in position during the pitting operation, and spaced blades arranged to guide the pit of the peach to a position between said jaws and to form a recess in the flesh thereof, and additional guide plates arranged on opposite sides of said jaws to house the jaws, said last named plates being arranged substantially in alignment with said blades whereby substantially continuous guide surfaces are provided.

9. A peach pitting machine including a pair of jaws, a pair of pitting knives, means to move said jaws and knives toward each other to cause them to embrace the pit of a peach, and spaced guide plates on opposite sides of said jaws and knives between which said jaws and knives recede when they are in inoperative position.

10. A peach pitting machine comprising a frame, jaws slidably mounted in said frame, pitting knives arranged to be moved into poistion with said jaws but mounted so that they may be rotated with respect thereto, means to yieldingly urge said jaws and knives toward the pit of the peach, and an adjustable stop accessible from the exterior of the machine to predetermine the extent of movement of the knives and jaws toward each other.

11. A peach pitting machine comprising a stationary frame, jaws, pitting knives, means causing said jaws and said knives to enter a recess in the flesh of the peach and to remove the pit therefrom, and fluid means to separate the fruit halves from said jaws and knives controlled by the movement of said jaws relative to said frame.

12. A fruit coring machine comprising a stationary frame, jaws slidably mounted in said frame, coring knives, said jaws and knives being arranged to enter a recess in the flesh of the fruit and to respectively hold and cut the core from the flesh, a fluid conduit in said jaws having an outlet so arranged that the flesh of the fruit will be separated from the core after the operation of the coring knives by the flow of fluid, and means to supply fluid to said conduit, said last named means being controlled by the position of the slidable jaws with respect to the frame.

13. A fruit coring machine comprising a rotatable coring head, coring knives carried by said head, means to rotate said head, a gauge reciprocable axially of said head, means to reciprocate said gauge, and a fluid conduit in said reciprocable means to supply fluid in a direction axially of the head to eject the core after it has been severed by said knives.

14. A fruit pitting machine comprising two spaced elements designed to form a groove in the flesh of the fruit, said elements being spaced apart to provide a path of normally predetermined width between them for the substantially intact pit and being yieldable to provide a widened path when an enlarged pit is encountered, and readily adjustable accessible means to vary the normal width of said path.

15. A fruit pitting machine comprising two space groove forming elements designed to form a groove in the flesh of the fruit, said elements having portions normally spaced apart a distance approximating the width of the pit and other portions normally spaced apart a distance approximating the length of the pit, means to support said elements so that they may yield when an abnormal pit is encountered in a manner so that the groove forming elements are maintained in substantial parallelism, and readily accessible means to vary the normal spacing of said elements.

16. A peach pitting machine comprising a frame, a pitting head carrying pitting knives slidable therein, means to hold the peach during the operation of the pitting knives, means to rotate the pitting head, means to operate said holding means, and mechanism carried by said holding means to determine the path of movement of the knives in said pitting head comprising a pair of cams, movable toward and from each other and connected together by members that cause the cams to maintain a definite relation to each other and to the pitting knives in all positions thereof.

17. A fruit pitter including fruit holding means and mechanism to cause said holding means to alternately engage and be disengaged from the fruit, comprising a toggle constituting a pair of links designed to be in substantial alignment when said holding means is in operative position and out of alignment when said means is in inoperative position whereby the holding means tends to remain in its operative position.

18. A fruit pitter including fruit holding means, a coring knife, means movable with said holding means to determine the path of movement of said knife, and mechanism including a toggle comprising a pair of links arranged to extend substantially in alignment when said first named means are in operative position and to be out of alignment to permit separation of said means and elements to control the position of said links.

19. A peach pitting machine comprising a pair of holding jaws, a pitting head, knives in said head slidable toward and away from the axis of said head, means to rotate said head, a pair of knife guides movable as a unit with said jaws, means connected to said knives and movably mounted in said guides, and mechanism to simultaneously move said jaws and guides into operative position, said mechanism comprising two pairs of links constituting toggles, an element to couple said toggles together for simultaneous movement in opposite directions and means to operate said element in timed relation to said knives 20. A peach pitting machine including means to guide the peach to a pit removing station and to form a recess in the flesh of the peach, a movable gauge to determine the position of the peach at said station, fruit holding jaws, pitting knives to remove a core including the pit from the flesh of the peach, means to automatically and in timed relation move said holding jaws into operative position and to then cause said knives to remove said core, and readily accessible adjusting means to adjust said guiding means, said gauge, said holding jaws and said knives.

21. A peach pitting machine including means to form cuts in the flesh of the fruit, a pair of jaws, a pair of pitting knives arranged to enter the cut in the flesh of the fruit, means to cause said jaws and knives to approach and recede from each other, and guide plates forming a continuation of the first said means and housing said jaws and knives when they are in their retracted position.

In testimony whereof I affix my signature.

ARTHUR L. DUNCAN.